US012801827B2

(12) United States Patent
Stewart et al.

(10) Patent No.: US 12,801,827 B2
(45) Date of Patent: Nov. 17, 2026

(54) SYSTEMS AND METHODS FOR AUTOMATICALLY GROUPING DESIGN ELEMENTS

(71) Applicant: Canva Pty Ltd, Surry Hills (AU)

(72) Inventors: Andrew James Stewart, Sydney (AU); Michelle Munn Wai Seeto, Five Dock (AU)

(73) Assignee: Canva Pty Ltd, Surry Hills (AU)

( * ) Notice: Subject to any disclaimer, the term of this patent is extended or adjusted under 35 U.S.C. 154(b) by 143 days.

(21) Appl. No.: 18/752,178

(22) Filed: Jun. 24, 2024

(65) Prior Publication Data

US 2024/0346725 A1 Oct. 17, 2024

Related U.S. Application Data

(63) Continuation of application No. 17/589,952, filed on Feb. 1, 2022, now Pat. No. 12,056,802.

(30) Foreign Application Priority Data

Feb. 2, 2021 (AU) ................................ 2021200649

(51) Int. Cl.
*G06F 40/106* (2020.01)
*G06F 40/103* (2020.01)
*G06T 11/60* (2026.01)

(52) U.S. Cl.
CPC ............ *G06F 40/106* (2020.01); *G06T 11/60* (2013.01); *G06F 40/103* (2020.01)

(58) Field of Classification Search
CPC .... G06F 30/398; G06F 30/392; G06F 40/106; G06T 11/60; G06T 11/206; G06T 2200/24; G06T 2207/30176; G06T 7/0006
See application file for complete search history.

(56) References Cited

U.S. PATENT DOCUMENTS 10,916,067 B1 * 2/2021 Gehlaut ............ G06F 18/23213
10,970,458 B1 * 4/2021 Dhanuka .............. G06V 30/416
2015/0154164 A1 6/2015 Goldstein et al.
2022/0148233 A1 5/2022 Agarwal et al.

OTHER PUBLICATIONS

Steven J. Harrington et al., Aesthetic measures for automated document layout, DocEng '04: Proceedings of the 2004 ACM symposium on Document engineering Oct. 2004, pp. 109-111 (https://doi.org/10.1145/1030397.1030419).

* cited by examiner

*Primary Examiner* — Xiao M Wu
*Assistant Examiner* — Scott E Sonners
(74) *Attorney, Agent, or Firm* — GrowIP Law Group LLC

(57) ABSTRACT

Described herein is a computer implemented method for automatically grouping design elements on a page. The method includes: determining an initial set of design element groups; performing one or more design element grouping iterations, each including: calculating a set of pairwise relationship scores and determining, based on the set of pairwise relationship scores, whether any pairs of design element groups should be combined. In response to determining that a particular pair of design element groups should be combined the method further includes combining the particular pair of design element groups into a single design element group.

20 Claims, 9 Drawing Sheets

SYSTEMS AND METHODS FOR AUTOMATICALLY GROUPING DESIGN ELEMENTS

CROSS-REFERENCE TO RELATED APPLICATIONS

This application is a U.S. Continuation Application that claims priority to U.S. Non-Provisional application Ser. No. 17/589,952, filed Feb. 1, 2022, that claims the benefit of the filing date of Australian Patent Application No. 2021200649, filed Feb. 2, 2021, which are hereby incorporated by reference in their entirety.

FIELD

The present disclosure is directed to systems and methods for automatically grouping design elements.

BACKGROUND

Various computer implemented tools for creating and publishing designs exist. One example is the tool provided by Canva Pty Ltd. Generally speaking, in order to create designs, such tools allow users to add design elements to a page. Design elements may be accessed and added from one or more element libraries and/or created using tools such as drawing and/or text tools.

Another feature offered by many design creation tools is the ability to group design elements together.

Grouping elements can allow various operations to be more conveniently performed. For example, if a user wishes to make a same position change to 5 design elements, most design tools will enable this to be done by either individually moving each element (e.g. by dragging from an initial location to a new location) or by grouping the elements and moving the group as a whole.

In addition, the manner in which elements are grouped may impact how certain operations are performed. Two examples of such operations are page resizing (where a user changes the size and/or aspect ratio of a page) and re-layouting (where the one or more new element layouts are automatically generated and displayed). In these operations, the design tool may automatically adjust the sizes and/or positions of design elements to fit with the resized page or to change their layout on a page. The manner in which elements are grouped can change the way elements are adjusted and, ultimately, impact on how successful or otherwise the automatic adjustment is.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

Described herein is a computer implemented method for automatically grouping design elements on a page, the method comprising: receiving a request to automatically group the design elements into design element groups; in response to receiving the request: determining an initial set of design element groups, each design element group comprising one or more of the design elements; performing one or more design element grouping iterations, wherein performing a design element grouping iteration comprises: calculating a set of pairwise relationship scores, each pairwise relationship score in the set of pairwise relationship scores being in respect of a distinct pair of design element groups, determining, based on the set of pairwise relationship scores, whether any pairs of design element groups should be combined; and in response to determining that a particular pair of design element groups should be combined, combining the particular pair of design element groups into a single design element group; and returning the design element groups.

BRIEF DESCRIPTION OF THE DRAWINGS

Preferred embodiments of the invention will be described, by way of examples only, with reference to the accompanying representations, wherein.

DETAILED DESCRIPTION OF THE EMBODIMENTS

Figure 1:
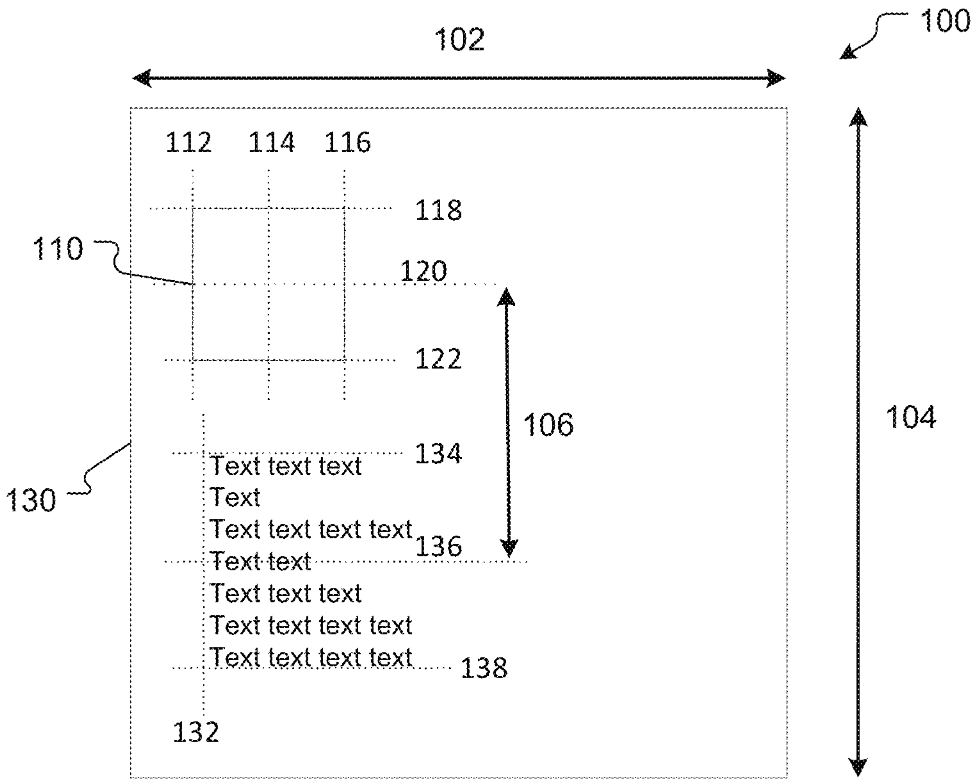
FIG. 1 shows an example design page.

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, many design tools provide functionality that allows design elements to be grouped together. Such grouping is typically performed by a user selecting elements and either: creating a new group that includes the selected elements; adding the selected elements to an existing group; or removing the selected elements from an existing group.

The present disclosure, however, is directed to systems and methods for processing design elements to automatically group design elements together in design element groups.

Once design element groups have been created they may be used for one or more specific purposes. For example, an automatically determined design element group may be used during a page resizing operation and/or an automatic element layout operation. As another example, one or more automatically determined design element groups may be used to provide suggested element groupings to a user who can then confirm, reject, or adjust a given set of groups that has been suggested (and/or amend element membership of those groups).

As a further example, and in accordance with certain embodiments described herein, design element groups may be further processed to determine supergroups—i.e. groups of design element groups.

Design Pages and Design Elements

The embodiments described herein refer to design pages and design elements.

Pages

A design page (page for short) defines an area that is intended to be viewed as a discrete whole. A page may also be referred to as a canvas. While a design tool may allow designers to create designs (e.g. documents) with multiple distinct pages, the present embodiments operate on an individual page basis.

A page will have certain page attributes, for example a page identifier (typically assigned by the design tool and unique at least for the design in question), a page width, and a page height. The width and height of a page define both its size and aspect ratio.

A page has an associated coordinate system (typically a common coordinate system provided by the design tool for all pages). By way of example, the page coordinate system may be a Cartesian coordinate system defining a horizontal (x) axis and vertical (y) axis.

The units of the coordinate system can be any appropriate units, for example pixels, millimetres, centimetres, inches, or an alternative unit.

The origin of the coordinate system (x=0, y=0), and direction in which x and y increase/decrease, may be defined as desired. In the present embodiments, the origin (x=0, y=0) for a page is defined as the top left corner of the page, with x-axis coordinates increasing from left to right and y-axis coordinates increasing from top to bottom.

In the embodiments described herein, a page (e.g. the page identifier) is associated with a list of design elements. A page's design element list is used to record all design elements that have been added to the page—e.g. a list of design element identifiers.

Page (and element data) may be stored in a device independent design descriptor. By way of example, a design descriptor may be stored in a JSON format file such as the following:

```
{
  "design": {
    "id": "abc123",
    "creationDate": "1-jun-2020",
    "dimensions": {
        "width": 1080,
        "height": 1080
    },
    "elements": [
      {. . .},
      {. . .},
      . . .
      {. . .}
    ],
  }
}
```

In this example, the design descriptor includes design metadata (e.g. a design identifier, a design creation date, and page dimensions (a height and a width) and an array of element descriptors in respect of elements that have been added to the page (described below).

Design Elements

Design elements (elements for short) are objects that are added to a page. Elements may be copied or imported from one or more element libraries (e.g. libraries of images, animations, videos, etc.). Alternatively, elements may be drawn or created using one or more design tools, for example a text tool, a line tool, a rectangle tool, an ellipse tool, a curve tool, a freehand tool, and/or other design tools or combinations thereof.

An element that has been added to a page (and added to the page's element list) may be identified in various ways. For example, an element may be identified by its position (index) in the element list. Alternatively (or in addition) an element may be assigned an element identifier that is unique at least within the page that the element has been added to.

A given design element has associated element attributes. The particular element attributes that are or can be associated with a given element may depend on the type of element in question. By way of example, however, element attributes may include one or more of those shown in the table below:

| Element attribute | Description |
|---|---|
| Identifier | Identifier for the element (unique at least within the page the element has been added to). Alternatively, the position (index) of the element within an element list may be used to identify an element. |
| Type | Identifier of a type of the element. For example, a text element, a vector graphic element, a raster graphic element, a video element, an element group, an alternative type of element. |
| Top | The y coordinate of the element's origin (e.g. y coordinate of the top left corner). |
| Left | The x coordinate of the element's origin (e.g. x coordinate of the top left corner). |
| Width | A value defining the width of the element. |
| Height | A value defining the height of the element. |
| Rotation | A value defining a degree of rotation of the element, e.g. a value x such that −180 degrees <= x <= +180 degrees. |
| Opacity | Data defining any transparency applied to the element. |
| x-flipped data | For example a Boolean indicating whether the element has been flipped in the x dimension. |
| y-flipped data | For example a Boolean indicating whether the element has been flipped in the y dimension. |
| Media reference | Data defining a fill of a rectangular element - for example an identifier of a library element image, video, or other media file used to fill the element. |
| Children | Data in respect of child elements (where the element is a group) |

Additional (and/or alternative) element attributes are possible.

Element attributes for a given element may be stored in an element descriptor (which is included in the page's element list). For example:

```
{
  "design": {
    . . .
    },
    "elements": [
      {
        "type": "IMAGE",
        "top": 100,
        "left": 100,
        "width": 500,
        "height": 400,
        "rotation": 0,
        "opacity": 1,
        "mediaReference": "abc123"
```

-continued

```
            }
          ],
        }
      }
```

The design tool may define the origin point for elements to be any defined (consistent) point. In the embodiments described herein, the origin point is defined as the top left corner of an element—i.e. x=the leftmost x coordinate of the element and y=the topmost y coordinate of the element. Alternative element origin points may however be used—e.g. any other corner of the element, a centre point of the element, or any other defined origin point.

Element x/y coordinates and widths/heights are typically in the units of the coordinate system for the page the element is positioned on.

Any appropriate value may be used for rotation (e.g. degrees or radians). Rotation may be about a predefined constant pivot point (e.g. a centre point of the element (e.g. (((origin×coordinate+width)/2), ((origin y coordinate+height)/2)), the origin, a corner of the element, or an alternative predefined constant pivot point. Alternatively, rotation may be about a pivot point that is defined for each individual element, either by a user or automatically (e.g. a pair of pivot coordinates (pivot x, pivot y)).

As discussed below, an element may be a member of an explicitly defined (i.e. user defined) group of elements. In this case, and in the present examples, the element origin, rotation, x-flipped data, and y-flipped data are relative to the group the element is a member of. This is discussed further below. If an element is not a member of a group, these attributes are with respect to the page as a whole.

Design Element Depth

As noted above, a given page has a list of elements that defines the elements that have been added to that page.

When an element is added to the page the element (or element identifier) is added to the page's element list. Absent explicit user manipulation, elements are added to the page's element list in the order they are added to the page. In some implementations, the first item in the page's element list (i.e. list index 0) will be a background element. In this case, the first element added to the page by a user becomes the second item in the page's element list (index 1 of the list), the next element added becomes the third item in the page's element list (index 2 of the list) and so forth.

Constructing a page's element list in this manner means that an element's position (index) in the element list also defines its depth or z-index in the page: i.e. an element at index n is behind an element at index n+1 and in front of an element at index n−1. Where a given element is in front of one or more other elements it can, depending on position/size/rotation/transparency, occlude or partially occlude any/all elements it is in front of. I.e. an element at index n is in front of all elements with an index of <n.

In alternative embodiments element depth may be an explicitly stored design element attribute.

Design tools typically provide mechanisms for a user to manually adjust an element's depth, for example by bringing forward, sending backwards, bringing to front, sending to back. If such adjustments are made, corresponding changes are made to the order of the page's element list.

Design Element Axes

In the present disclosure, each design element has a set of axes. These axes are used to calculate the axes of design element groups (discussed below), which in turn are used to calculate relationship scores between pairs of design element groups.

Non-text design elements have a three vertical axes (left, horizontal centre, right, each defined by an x coordinate) and three horizontal axes (top, vertical centre, and bottom, each defined by a y coordinate).

Text design elements have a subset of these axes based on an alignment of the text in the text design element. For example, text design elements having:

- horizontal text that is left biased have a left, top, vertical centre, and bottom axis;
- horizontal text that is centre biased have a horizontal centre, top, vertical centre, and bottom axis;
- horizontal text that is right biased have a right, top, vertical centre, and bottom axis;
- vertical text that is top biased have a left, horizontal centre, right, and top axis;
- vertical text that is centre biased have a left, horizontal centre, right, and vertical centre axis; and
- vertical text that is bottom biased have a left, horizontal centre, right, and bottom axis.

By way of example, FIG. 1 shows a page 100 having a page width 102, a page height 104, a design element 110, and a design element 130.

Design element 110 is a non-text design element defining a plurality of vertical axes (left axis 112, a horizontal centre axis 114, and a right axis 116) and a plurality of horizontal axes (top axis 118, vertical centre axis 120, bottom axis 122). In the present example:

- The left axis 112 is the left edge of the design element 110 (i.e. the minimum x-coordinate of design element 110).
- The right axis 116 is the right edge of the design element 110 (i.e. the maximum x-coordinate of design element 110).
- The horizontal centre axis 114 is a vertical line passing through the horizontal centre of the design element 110 (i.e. the central x-coordinate of design element 110). This may be calculated for example as (left axis+((right axis−left axis)/2)).
- The top axis 118 is the top edge of the design element group 110 (i.e. the minimum y-coordinate of design element 110).
- The bottom axis 122 is the bottom edge of the design element group 110 (i.e. the maximum y-coordinate of design element 110).
- The vertical centre axis 120 is a horizontal line passing through the vertical centre of the design element group 110 (i.e. the central y-coordinate of design element 110). This may be calculated for example as (top axis+((bottom axis−top axis)/2)).

Design element 130 is a text element having horizontal text having a left bias/alignment. In this case, the set of axes of design element 130 includes a left axis 132 (i.e. the minimum x-coordinate of the design element 130), a top axis 134 (i.e. the minimum y-coordinate of the design element 130), a vertical centre axis 136 (the central y-coordinate of the design element 130), and a bottom axis 138 (i.e. the maximum y-coordinate of the design element 130).

Design Element Groups

Design tools also typically provide mechanisms for grouping elements on a page. Generally speaking, an element group is made up of one or more member elements.

As noted, the present disclosure is concerned with automatically creating design element groups. For clarity, therefore, design element groups that are manually/explicitly created by a user will be referred to as explicit element groups.

Explicit design element groups (i.e. those manually created by a user) can be handled in various ways. For example, and continuing the example element array format above, a design group may be defined by a 'GROUP' type element and include 'children' array, each element of which defines a child element. By way of alternative example, element groups may be defined by a group identifier (e.g. an element metadata item that identifies a particular group a given element is a member of).

Whether an element group is explicit (created by a user) or automatically created the group's size and position attributes (e.g. origin, width and height) can be calculated based on the size/position/rotation attributes of its constituent members. Example calculations (with the coordinate system described above in mind) are as follows.

The (x, y) origin of a group is calculated as ((minimum or equal minimum x coordinate of all elements in the group after any rotation is applied), (minimum or equal minimum y coordinate of all elements in the group after any rotation is applied)).

The width of a group is calculated as: (maximum/equal maximum×value of the group's elements)−(minimum/equal minimum×value of the group's elements).

The maximum×value of a group's elements can be calculated by calculating maximum x-coordinates for all elements in the group and selecting the maximum/equal maximum maximum x-coordinate. Calculating the maximum x-coordinate for a given element is done by adding the element's width to its x origin.

The minimum x-value of a group's elements will, in this example, be the x origin of the group as described above.

The height of a group can calculated in the same manner as the width (however working on the y axis rather than x axis)—e.g. (maximum/equal maximum y value of the group's elements)−(minimum/equal minimum y value of the group's elements).

Group Axes

The automatic design element grouping process 500 described herein involves calculating relationship scores for pairs of design element groups. Similarly, the automatic group grouping process 800 described herein involves calculating relationship scores for pairs of supergroups. Calculation of a relationship score for a given pair of groups (whether a pair of design element groups or a pair of supergroups) is based, in part, on alignment (or lack thereof) between two groups. Alignment, in turn, is calculated based on corresponding pairs of group axes.

In the present disclosure, a group (whether a design element group of one or more design elements or a supergroup of one or more design element groups) may define a plurality axes. The axes of a group are determined based on the axes of the group's elements.

A design element group with a single design element member will have the same axes as the axes of its member design element. For example, the axes of a design element group comprising only design element 110 will be the same as the axes of design element 110 (e.g. left axis 112, horizontal centre axis 114, right axis 116, top axis 118, vertical centre axis 120, and bottom axis 122). As another example, the axes of a design element group comprising only design element 130 will be the same as the axes of design element 130 (e.g. left axis 132, top axis 134, vertical centre axis 136, and bottom axis 138).

A design element group that has multiple design element members will only have axes that are common to all design element members. For example, a design element group comprising design element 110 and design element 130 will only have a left, top, vertical centre, and bottom axis (i.e. the axes that are common to both design element 110 and design element 130).

Similarly, a supergroup that has multiple design element group members will only have axes that are common to all design element group members.

Over the course of the automatic grouping processes described below groups/supergroups are (presuming certain criteria are met) progressively combined. For example in one iteration group 1 (which may have one or more members) may be combined with group 2 (which may have one or more members) to create a new group 10. In a subsequent iteration group 10 (which has the members of original groups 1 and 2) may be combined with group 3 (generating a group with the members of original groups 1, 2, and 3). When combining groups, the position of a given axis of the new (or combined) group is determined as the average positions of that axis in each of the two groups being combined.

To illustrate the above, consider combining two groups: group 1 with the axis set (L1, R1, HC1, T1, B1, VC1) and group 2 with the axis set (L2, R2, HC2, T2, B2, VC2) (where L=left axis, R=right axis, HC=horizontal centre axis, T=top axis, B=bottom axis, VC=vertical centre axis). In this case, the resulting group (e.g. group 3) will have the following axis set:

L=average (L1,L2)
R=average (R1,R2)
HC=average (HC1,HC2)
T=average (T1,T2)
B=average (B1,B2)
VC=average (VC1,VC2)

As a further example, group 1 did not have a right axis or horizontal centre axis nor would the combined group (group 3).

Group axes may be calculated in alternative ways. For example, a given group axis may be calculated as the average of each member element's value for that axis. E.g. a group with 5 elements (1 to 5) all having a top axis (T1, T2, T3, T4, T5) would have a top axis value equal to the average of (T1, T2, T3, T4, T5).

Repeating Fragments

In the described embodiments, the automatic grouping process 500 involves identifying what will be referred to as repeating fragments. In the present disclosure repeating fragments are groups of two or more elements that satisfy the following criteria: the groups have a degree of alignment; and the elements of each group are of the same or similar content types (as defined in a group's content map, also described below).

Figure 10:
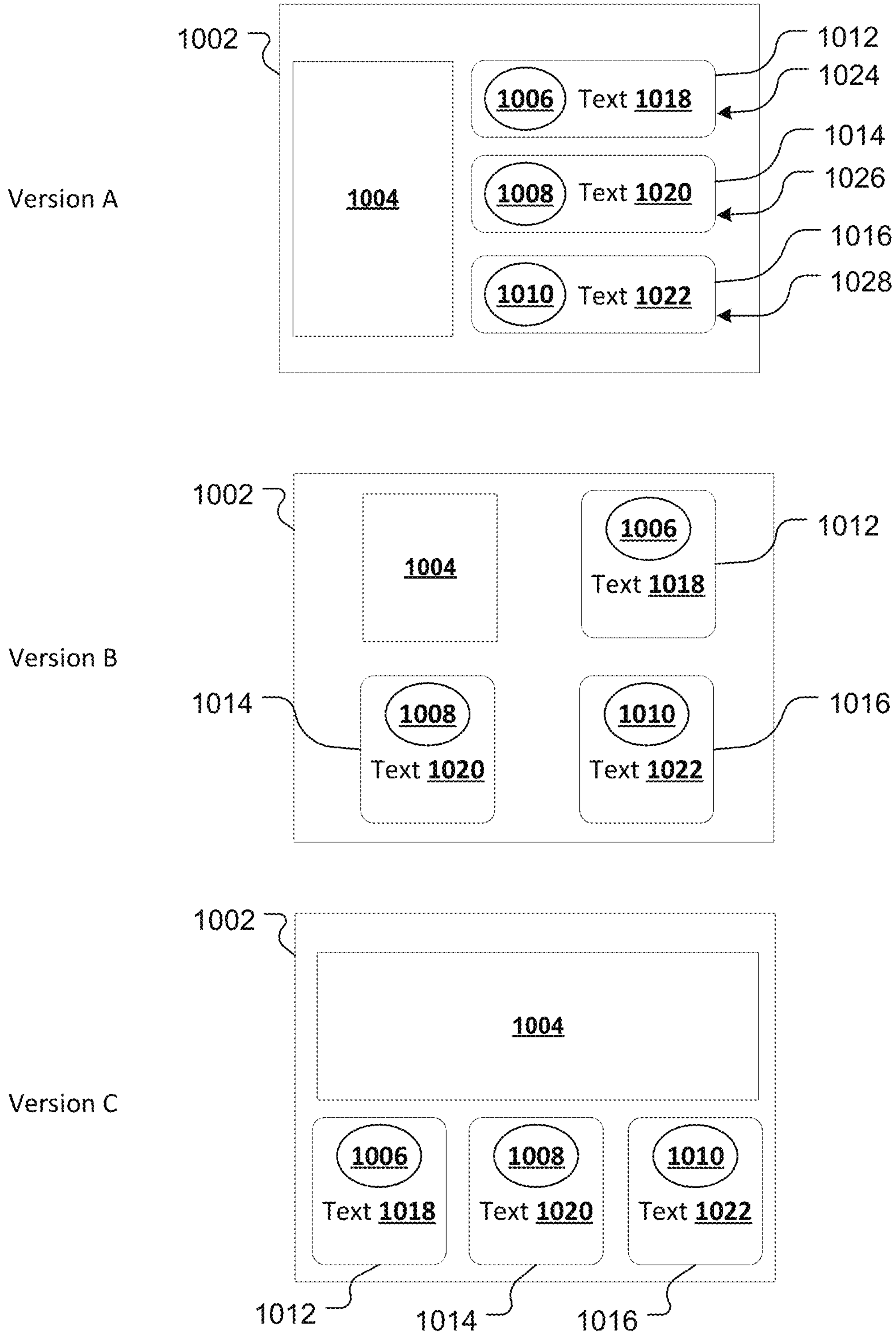
FIG. 10 shows three versions of an example design page.

To illustrate repeating fragments, FIG. 10 shows a three versions (A, B, and C) of a page 1002. Page 1002 includes: four image elements 1004, 1006, 1008, and 1010; three shape elements 1012, 1014, and 1016 (in this case rounded corner rectangles); and three text elements 1018, 1020, and 1022. On processing page 1002, three element groups are identified: a first group 1024 that includes elements 1006, 1012 and 1018; a second group 1026 that includes elements 1008, 1014, 1020; and a third group 1028 that includes elements 1010, 1016, and 1022. As can be seen, each element group 1024, 1026 and 1028 includes elements of the same content type (in this case one image element, one shape element, and one text element). Given this, element groups 1024, 1026, and 1028 will, in the processing described below, be identified as repeating fragments.

In the automatic element grouping process described below, groups that are identified as repeating fragments are not combined into a single group. For example, when processing page 1002 the elements of group 1024 will not be merged into either group 1026 or group 1028 (or vice versa) and the elements of group 1024 will not be merged into group 1028 (or vice versa). Maintaining such repeating fragments as independent groups allows those groups to be manipulated/processed independently (e.g. if automatically generating a new element layout). For example, by not combining element groups 152 and 154 these two groups can be manipulated independently.

While repeating fragments are not combined into a single group, the element group grouping process described below involves creating supergroups in which repeating fragments may be associated with one another. For example, a supergroup may be created that associates groups 1024, 1026, and 1028 with each other (but does not merge their member elements) By doing this, downstream manipulation/processing can take repeating fragments into account to maintain context or semantic meaning provided by the arrangement of the repeating fragments.

As one example of this, consider versions B and C of page 102. In each of versions B and C the elements of page 1002 have been rearranged (e.g. in an automatic layout process), and in each of versions B and C the elements within groups 1024, 1026, and 1028 have been kept together. In version C, the fact that groups 1024, 1026, and 1028 are repeating fragments (i.e. associated with each other in a supergroup) has been taken into account, and a relationship between those groups and element 1004 maintained. In version B, however, the fact that groups 1024, 1026, and 1028 are repeating fragments has not been taken into account, and the relationship between those groups and element 1004 has been lost.

Networked Environment

Figure 2:
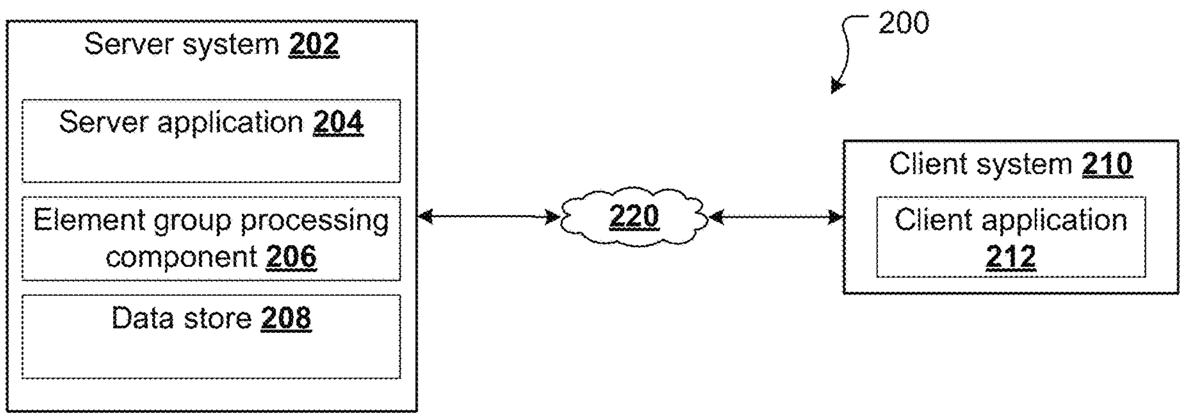
FIG. 2 is a block diagram illustrating an example environment in which features of the present disclosure can be implemented.

FIG. 2 depicts one example of a networked environment 200 in which the various operations and techniques described herein can be performed.

Networked environment 200 includes a design server system 202 and a client system 210 that are interconnected via a communications network 220 (e.g. the Internet). While a single client system 210 is illustrated and described, server system 202 will typically serve multiple client systems 210.

Server System

The design server system 202 includes various functional components which operate together to provide server side functionality.

One component of server system 202 is a front-end server application 204. The server application 204 is executed by a computer processing system to configure the server system 202 to provide server-side functionality to one or more corresponding client applications (e.g. client application 212 described below). The server-side functionality includes operations such as user account management, login, and design specific functions—for example creating, saving, publishing, sharing designs.

To provide the server-side functionality, the server application 204 comprises one or more application programs, libraries, APIs or other software elements. For example, where the client application 212 is a web browser, the server application 204 will be a web server such as Apache, IIS, nginx, GWS, or an alternative web server. Where the client application 212 is a specific application, the server application 204 will be an application server configured specifically to interact with that client application 212. Server system 202 may be provided with both web server and application server modules.

In the present example, server system 202 also includes a data store 206 which is used to store various data required by the server system 202 in the course of its operations. Such data may include, for example, user account data, design template data, design element data, and data in respect of designs that have been created by users. While one data store 206 is depicted server system 202 may include/make use of multiple separate data stores—e.g. a user data store (storing user account details), one or more element library data stores (storing elements that users can add to designs being created); a template data store (storing templates that users can use to create designs); a design data store (storing data in respect of designs that have been created); and/or other data stores.

In order to provide server side functionality to clients, server system 202 will typically include additional functional components to those illustrated and described. As one example, server system 202 will typically include one or more firewalls (and/or other network security components) and load balancers (for managing access to the server application 204).

The server system 202 components have been described as functional components, and may be implemented by hardware, software (data and computer readable instructions which are stored in memory and executed by one or more computer processing systems), and/or a combination of hardware and software.

The precise hardware architecture of server system 202 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, server application 204 214 may run on a single dedicated server computer and data store 206 may run on a separate server computer (with access to appropriate data storage resources). As an alternative example, server system 202 may be a cloud computing system and configured to commission/decommission resources based on user demand 204. In this case there may be multiple server computers (nodes) running multiple server applications 204 which service clients via a load balancer.

Client System

Client system 210 hosts a client application 212 which, when executed by the client system 210, configures the client system 210 to provide client-side functionality for/interact with the server application 204 of the server system 202. Via the client application 212, a user/designer can interact with the server application 204 in order to perform various operations such as creating, editing, saving, retrieving/accessing, publishing, and sharing designs.

Client application 212 may be a web browser application (such as Chrome, Safari, Internet Explorer, Opera, or an alternative web browser application) which accesses the server application 204 via an appropriate uniform resource locator (URL) and communicates with server application 204 via general world-wide-web protocols (e.g. http, https, ftp). Alternatively, the client application 212 may be a specific application programmed to communicate with server application 204 using defined application programming interface (API) calls.

In the present example, client system 210 also includes an element group processing component 214 (EGP 214 for short). As described below, the EGP 214 performs (or configures the client application 212 to perform) processing to automatically group (or suggest groupings for) design elements. EGP 214 may be software module such as an add-on or plug-in that operates in conjunction with the client application 212 to expand the functionality thereof. In alternative embodiments, however, the functionality provided by the EGP 214 may be natively provided by the client application 212 (i.e. the client application 212 itself has instructions and data which, when executed, cause the client application 212 to perform part or all of the element grouping functionality described herein).

Client system 210 may be any computer processing system which is configured (or configurable) by hardware and/or software to offer client-side functionality. By way of example, client system 210 may be a desktop computer, a laptop computer, a netbook computer, a tablet computing device, a mobile/smart phone device, a personal digital assistant, or an alternative computer processing system.

Although not illustrated in FIG. 2, client system 210 will typically have additional applications installed thereon, for example, at least an operating system application such as a Microsoft Windows operating system, an Apple macOS operating system, an Apple IOS operating system, an Android operating system, a Unix or Linux operating system, or an alternative operating system.

Alternative Architectures

The architecture described above and illustrated in FIG. 2 is provided by way of example only, and variations are possible.

For example, while the EGP 214 has been described and illustrated as being part of/installed at the client system 210, the functionality provided by the EGP 214 could alternatively (or additionally) be provided by the server system 202 (for example as an add-on or extension to server application 204, a separate, stand-alone application that communicates with server application 204, or a native part of server application 204).

As a further example, the EGP 214 could be provided as an entirely separate service—e.g. running on a separate server system to server system 202 and communicating with client application 212 (and/or server system 202) as required to perform the element grouping functionality described herein.

As yet a further example, the design tool described herein may be a self-contained application that is installed and runs solely on a client system without any need of a server application.

Example Computer Processing System

The features and techniques described herein are implemented using one or more computer processing systems.

For example, in networked environment 200 described above, client system 210 is a computer processing system (for example a personal computer, tablet/phone device, or other computer processing system). Similarly, the various functional components of server system 202 are implemented using one or more computer processing systems (e.g. server computers or other computer processing systems).

Figure 3:
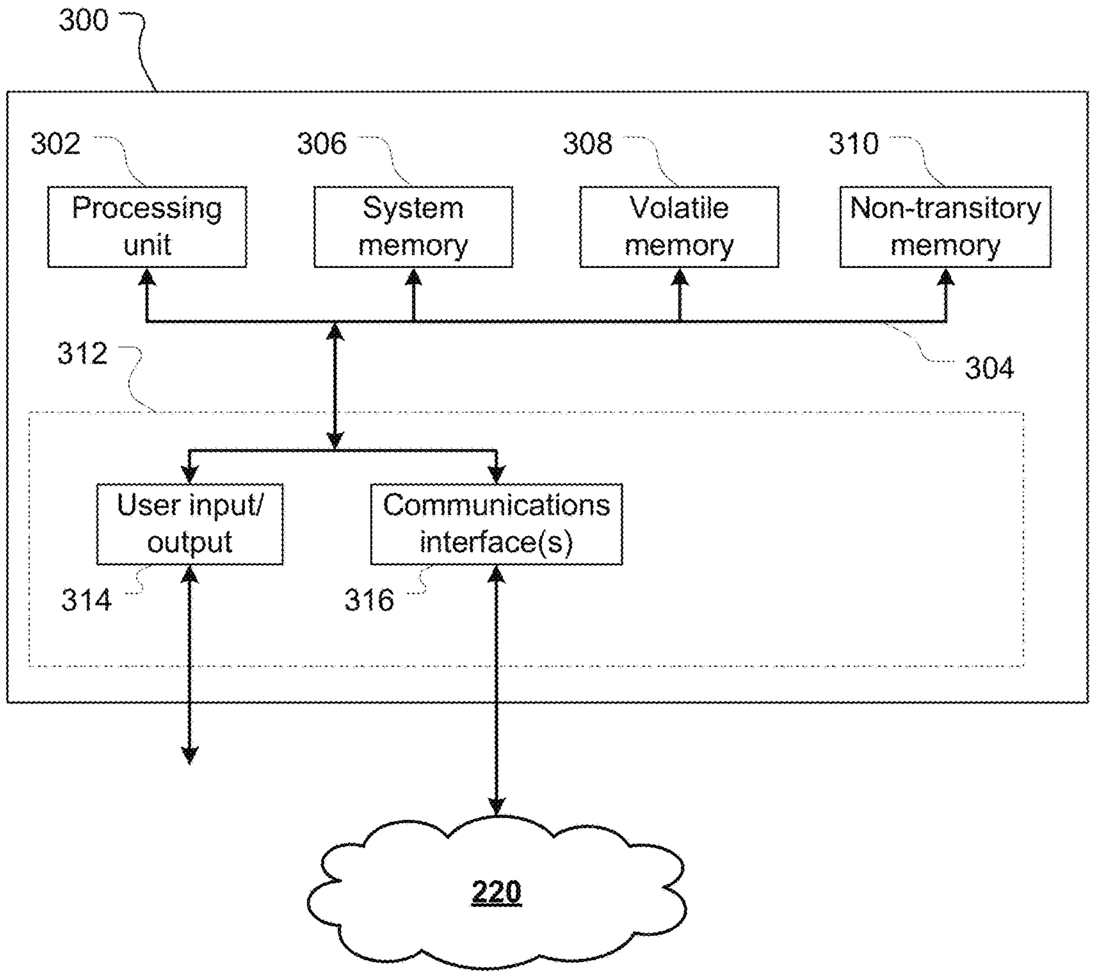
FIG. 3 is an example computer processing system configurable to perform various features described herein.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function, all processing required to perform that operation or function will be performed by processing unit 302. In other instances, processing required to perform that operation or function may also be performed by remote processing devices accessible to and useable by (either in a shared or dedicated manner) system 300.

Through a communications bus 304, the processing unit 302 is in data communication with a one or more machine readable storage (memory) devices which store instructions and/or data for controlling operation of the processing system 300. In this example, system 300 includes a system memory 306 (e.g. a BIOS), volatile memory 308 (e.g. random access memory such as one or more DRAM modules), and non-volatile memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices and the like. System 300 may also include or connect to one or more output devices controlled by system 300 to output information. Such output devices may include devices such as display devices, speakers, vibration modules, LEDs/other lights, and such like. System 300 may also include or connect to devices which may act as both input and output devices, for example memory devices (hard drives, solid state drives, disk drives, compact flash cards, SD cards and the like) which system 300 can read data from and/or write data to, and touch screen displays which can both display (output) data and receive touch signals (input).

System 300 also includes one or more communications interfaces 316 for communication with a network, such as network 220 of environment 200 (and/or a local network within the server system 202 or OS). Via the communications interface(s) 316, system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transitory machine readable medium accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application. System 300 also stores or has access to applications which, when executed by the processing unit 302, configure system 300 to perform various computer-implemented processing operations described herein. For example, and referring to the networked environment of FIG. 2 above: client system 210 includes a client application 212 which configures the client system 210 to perform the operations described herein.

In some cases, part or all of a given computer-implemented method will be performed by system 300 itself, while in other cases processing may be performed by other devices in data communication with system 300.

Design Creation and Editing

As described above, the present disclosure is generally concerned with automatically grouping (or suggesting groupings for) design elements. The particular manner in which a design is created is not of specific relevance to this disclosure, however in order to provide context, this section provides a simple example of a design creation user interface and the creation of a design.

Figure 4:
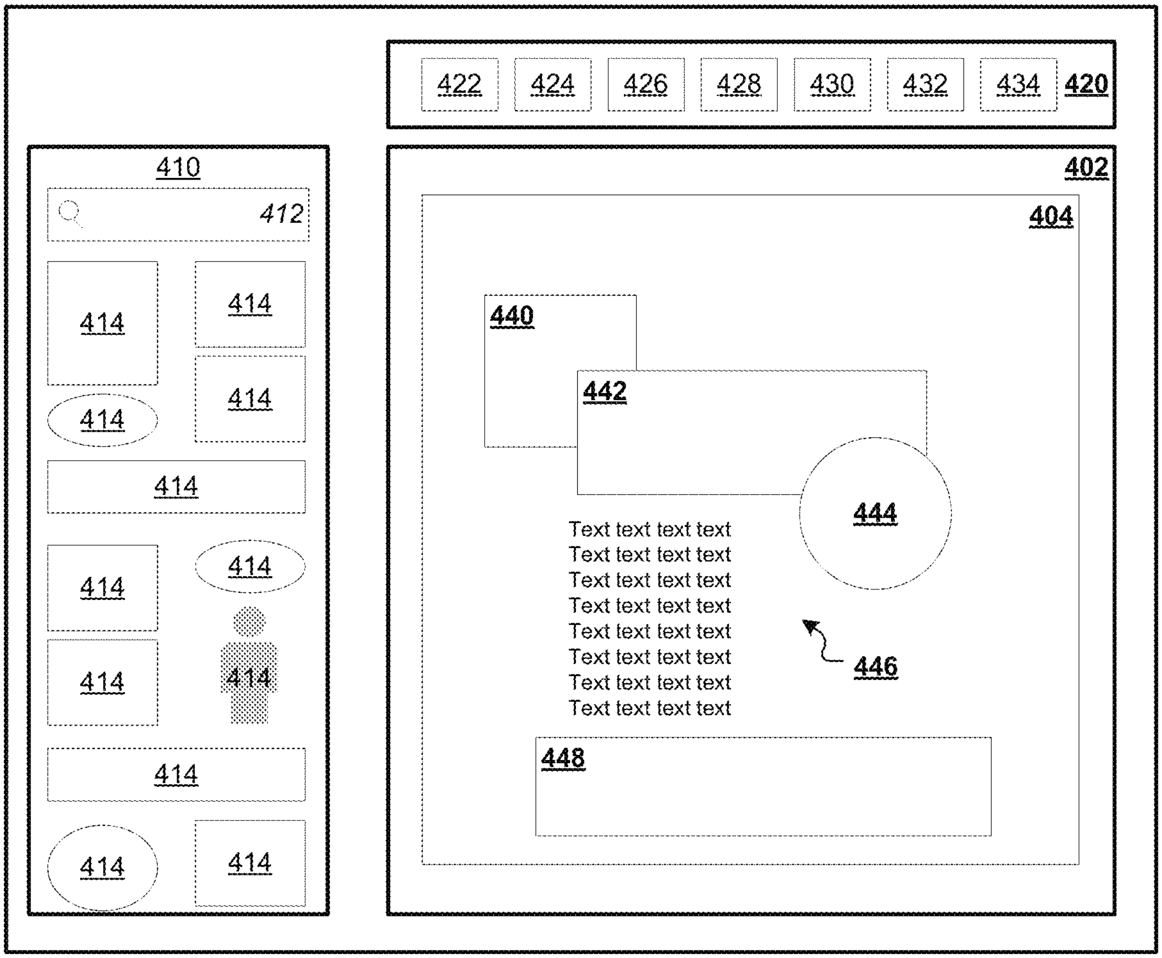
FIG. 4 provides an example of a design creation user interface.

FIG. 4 provides a depiction of a design creation user interface 400 which is displayed by a client system 210 (the client system 210 configured to do so by client application 212).

Via interface 400, a user can create a design document that comprises one or more pages and (inter alia) add elements to the page. Example design creation interface 400 includes a design creation pane 402 in which the design currently being worked on is displayed. In the present example, design creation pane 402 shows a single page 404 of a design document.

Design creation interface 400 also includes a design element search and selection pane 410 via which a user can search or browse one or more design element libraries, view design element previews 414, and select design elements to be included in the design document. To this end, pane 410 includes a search box 412 (allowing, in this case, a user to enter search text) and design element previews 414 providing preview images of design elements. Design elements previewed in the search and selection pane 410 can be added to the design being worked on (e.g. to page 404), for example by dragging and dropping, double-clicking, dwelling, or any other appropriate user interaction.

Design creation interface 400 also includes a toolbar 420 providing various tools for design creation and editing. In this particular example the tools include: an element selection tool 422 allowing a user to select a particular design element that has been added to the page 404; a drawing tool 424 allowing a user to draw a design element having a geometric or other shape; a text tool 426 allowing a user to add a textual design element; a colour tool 428 allowing a user to manually adjust one or more colours of a given design element; an import tool 430 allowing a user to import an element from another source (e.g. an element stored on locally or remotely accessible memory, an element from a third party server, etc.); a create explicit group tool 432 (allowing a user to explicitly create a group).

While not shown, toolbar 420 will typically be an adaptive toolbar in that the tools provided change depending on what the user is doing. For example, if a user selects the text tool 426 additional (or alternative) tools relevant to text may be displayed: e.g. a font selection tool and a text size tool.

In the present example, toolbar 420 also includes an automatically group elements control 434, activation of which triggers an automatic element grouping process as described below.

Generally speaking, in order to create a design, a user creates a page and adds design elements to that page. Design elements can be added in various ways. For example, a user can interact with the design element search and selection pane 410 to search/browse for design elements and then add elements to the design being created—e.g. by selecting a design element preview 414, dragging it to a position on the page 404, and dropping it. Alternatively, a user may create and add an entirely new element—e.g. by drawing an element using a tool such as drawing tool 424 or adding custom text via text tool 426. Further alternatively, a user may import an element via import tool 430.

In this specific example, page 404 includes five design elements: 440, 442, 444, 446, and 448.

Once an element has been added to the page it is added to the page's element list and the user can interact further with it—e.g. by adjusting its position, size (height and/or width), changing its depth with respect to other design elements on the page 404 (e.g. bringing forward, moving backward, bringing to front, moving to back), moving it to another page of the design document, changing its rotation, flipping it about an axis, adjusting colours, deleting it, duplicating it, adding it to a group, removing it from a group, etc.

Interface 400 is provided by way of example only, and alternative design creation interfaces (with alternative user interface elements and controls) are possible.

Automatic Design Element Grouping Process

This section describes processing involved in order to automatically group design elements together.

Certain operations are described as being performed by the EGP 214. As noted above, EGP 214 may be installed on a client system such as 210 or a server system such as 202. Alternatively, the functionality provided by the EGP 214 may be provided by a server application (such as server application 204 running on a server system 202), a client application (such as client application 212 running on a client system 210), or by a combination of applications running on the same or different systems.

Figure 5:
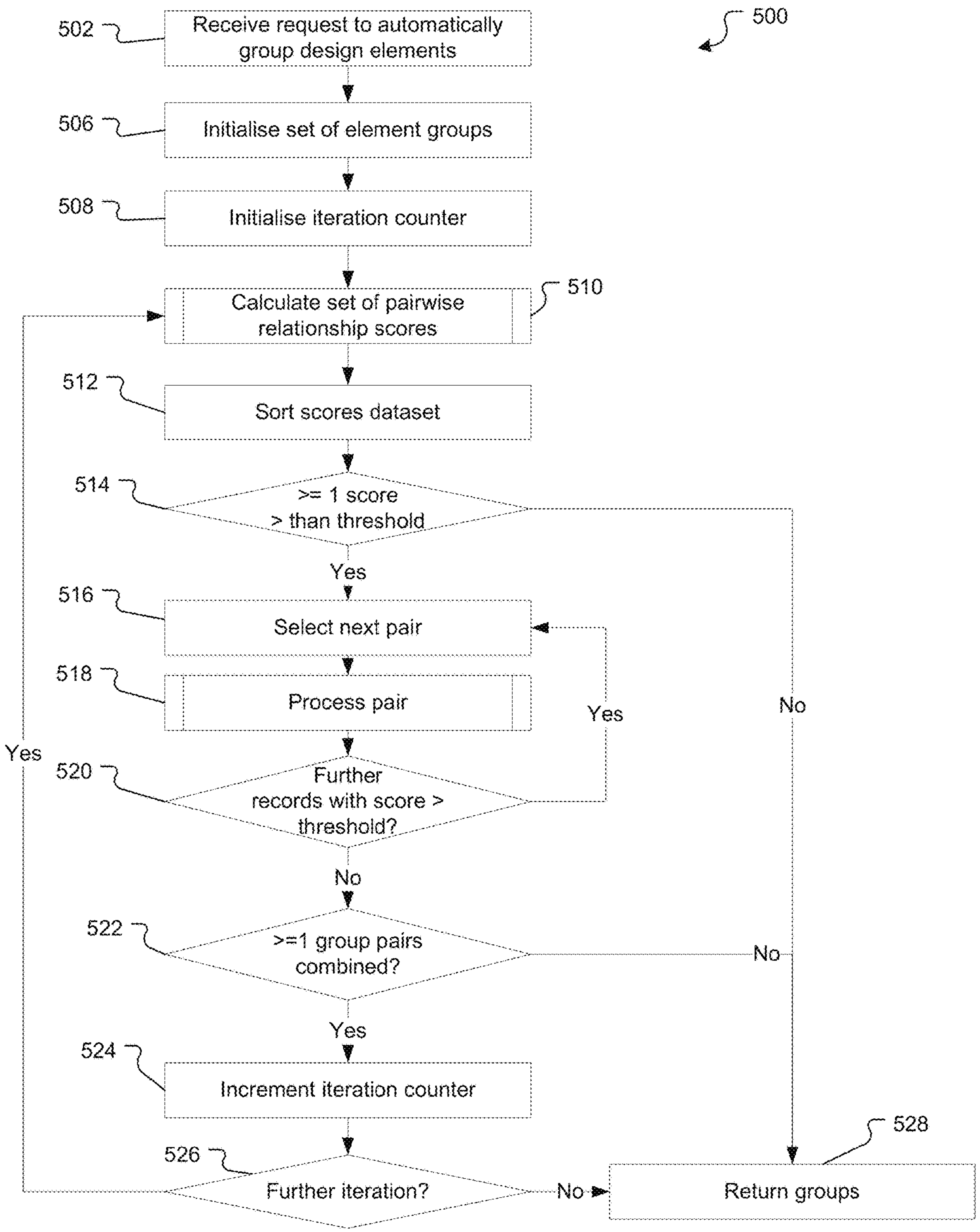
FIG. 5 is a flowchart depicting operations involved in an automatic element grouping process.

FIG. 5 is a flowchart depicting operations involved in an automatic element grouping process 500 for automatically grouping elements on a page.

At 502, the EGP 214 receives a request to automatically group the elements on a page. This request may be generated/provided to the EGP 214 in response to detecting an automatic element grouping trigger event.

In client-server architectures where the EGP 214 runs on the server system 202 (as described above with reference to FIG. 2), a trigger event may be detected by the client application 212 or the server application 204. If detected by the client application 212, detection of the trigger event causes the client application 212 to notify the server application 204 of the trigger event.

In stand-alone implementations (e.g. where all processing is performed by a single computer, such as client system 210), the trigger event is detected by the client application 212.

Various automatic element grouping trigger events are possible.

For example, receiving user input at client system 210 that activates a specific user interface control (e.g. an 'auto group elements' control 434 as described above) may be a grouping trigger event.

Automatic element grouping trigger events may additionally, or alternatively, be automatically occurring events. For example, the client application 212 and/or server application 204 may be configured such that automatic grouping is triggered when: a grouping-relevant page change is made; a grouping-relevant-element change is made; at defined and/or regular time intervals; and/or on any other appropriate event.

A grouping relevant page change may include: resizing a design page; saving a design page; adding a defined number (one or more) of new elements to a design page; deleting a defined number (one or more) existing elements from a design page.

A grouping-relevant change to an element may be any change made to an element that could impact the automatic grouping process. By way of example, grouping-relevant changes may include one or more of a page element being: moved (i.e. an origin change); resized (a change in width/height), rotated (a change in rotation value); added to an explicit group; removed from an explicit group; x-flipped or y-flipped (unless x/y flipping are about central x/y axes and do not change an elements origin, height and position).

In certain implementations, different trigger events may be associated with different trigger event types—for example a re-sizing trigger event (e.g. user interaction with one or more controls which allow the page size to be adjusted), a re-layouting trigger event (e.g. user interaction with a one or more controls which causes different element layouts to be generated and displayed).

In element grouping process 500 any explicitly created element groups are ignored—i.e. each element is (initially) treated independently whether a member of an explicit (user created) group or otherwise.

At 506, the EGP 214 initialises a set of design element groups. In the present embodiment this involves associating each design element of the page with its own group. This association may be made in various ways. By way of example, EGP 214 may generate an element groups dataset which is used over the course of process 500 to store associations between groups (via group identifiers) and member elements (via element identifiers). Such a dataset is initialised at 506 by associating each element identifier with a different group identifier. For example, an element groups dataset initialised for a page having four elements may be as follows:

| Design element group identifier | Element identifiers | Group axes |
|---|---|---|
| G001 | [E001] | [L1, R1, HC1, T1, B1, VC1] |
| G002 | [E002] | [L2, <null>, <null>, T2, B2, VC2] |
| G003 | [E003] | [<null>, R3, <null>, T3, B3, VC3] |
| G004 | [E004] | [L4, R4, HC4, T4, B4, VC4] |

In this example, the element groups dataset also stores the axes for each group. Here, axes are stored in an array which includes an element for each possible group axis (L=left axis, R=right axis, HC=horizontal centre axis, T=top axis, B=bottom axis, VC=vertical centre axis), the value for a given axis being left null or assigned a specific 'no-axis' value if the axis is not relevant. On initialisation of the element groups dataset each group will have the same set of axes as the single design element assigned to it. For example, group G001 has coordinate values for all axes while group G002 does not have right or horizontal centre axes (indicating the element of group G002 is a left aligned horizontal text element).

In alternative embodiments group axes may be stored in a different format, or not stored at all and instead calculated (based on the group's members) as and when needed (e.g. when calculating alignment and/or distance scores as described below).

At 508, the EGP 214 initialises an iteration counter variable. The automatic element grouping process 500 involves an iterative process (described below), which is limited to a predefined maximum number of iterations. The number iterations may be system defined or user defined. The iteration counter is set to zero when initialised by the EGP 214. By way of example, the maximum number of iterations may be set at 10, however alternative maximums are possible (e.g. between 10 and 20 iterations may be appropriate, or further alternative maximums).

At 510, the EGP 214 calculates a set of pairwise relationship scores for the current set of design element groups. The set of pairwise relationship scores includes a calculated relationship score for each distinct pair of design element groups. Calculating the set of pairwise relationship scores is discussed in further detail below with reference to FIG. 6, and in the present embodiment results in generation of a group scores dataset such as the following:

| Pairing of design element groups | Relationship score |
|---|---|
| [G001, G002] | |
| [G001, G003] | |
| [G001, G004] | |
| [G002, G003] | |
| [G002, G004] | |
| [G003, G004] | |

At 512, the EGP 214 sorts the set of group relationship scores in descending order (highest to lowest relationship score).

At 514, the EGP 214 determines if any of the relationship scores are above a group score threshold value. If so, processing proceeds to step 516. If not, processing proceeds to step 528. The group score threshold value is set based on the manner in which relationship scores are calculated. Using the specific relationship score calculation method described below (which has a maximum possible score of 100), a suitable group score threshold value is 75. Alternative thresholds are possible, for example values between 70 to 90 (or other values) may be appropriate.

At 516, the EGP 214 selects the next pair of design element groups that has not already been processed and that has the highest relationship score. It will be appreciated that for the first iteration loop, the EGP 214 selects the pair of design element groups having the highest relationship score.

Figure 7:
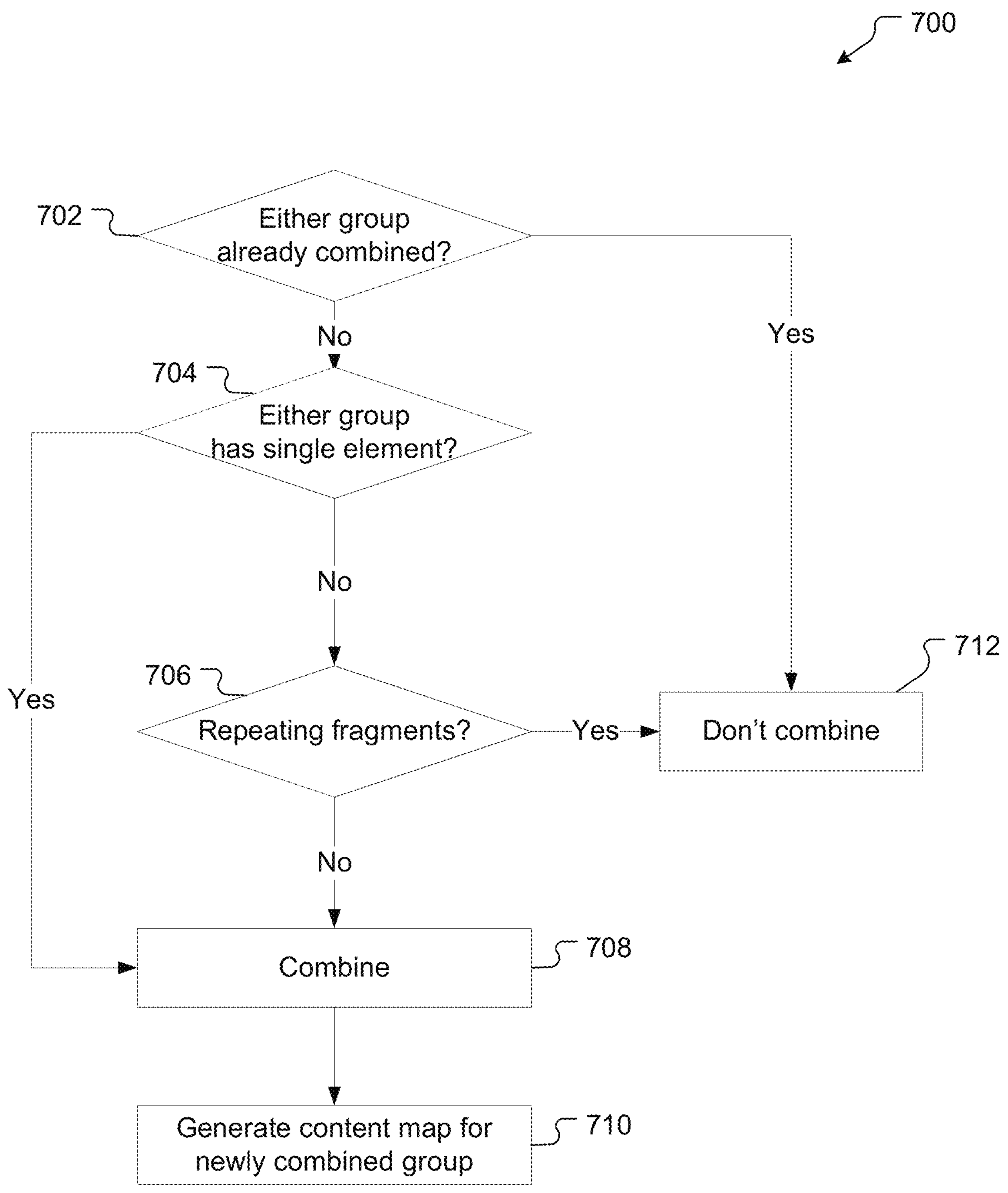
FIG. 7 is a flowchart depicting operations involved in determining whether a particular pair of design element groups should be combined together.

At 518, the EGP 214 processes the pair of design element groups selected at 516 to determine if the pair of design element groups should be combined together into a new design element group (and, if so, combine the element groups). Determining if a particular pair of design element groups should be combined together is described below with reference to FIG. 7.

At 520, the EGP 214 determines if there are any unprocessed pairs of design element groups that have a relationship score above the group score threshold value. If so, processing returns to step 516. If not, processing proceeds to step 522.

At 522, the EGP 214 determines if at least one pair of design element groups has been combined over the course of operations 516, 518, and 520. If so, processing proceeds to step 524. If not, processing proceeds to step 528.

At 524, the EGP 214 increments the iteration counter.

At 526, the EGP 214 determines if a further iteration is required. If the iterations counter indicates that the predefined maximum number of iterations has been performed, processing proceeds to step 528. If not, processing returns to step 510 to perform a further iteration (the further iteration taking into account the groups that were combined at 514).

In this example, a design element grouping iteration involves operations 510, 512, 514, 516, 518, 520, 522, 524, and 526.

At 528, the EGP 214 returns the design element groups as defined, for example, by the current state of the element groups dataset. Each design element group defined in the dataset indicates which design elements on the page have been combined together by the automatic grouping process.

The design element groups as returned by automatic grouping process 500 can be used in various ways. As one example, the EGP 214 may cause the client application 212 to visually indicate the design element groups (and element members thereof) on a user interface (e.g. design creation user interface 300). For example, the EGP 214 may cause the client application 212 to display one or more controls on the user interface that allows a user to select a particular group (in response to which elements of the group are visually distinguished from elements that are not members of the group) and controls operable by a user to accept, reject, and/or edit a selected design element groups.

As another example, the design tool may use the returned design element groups to determine how elements on the page should be treated during a page resize operation or element layout operation.

As a further example, the groups may be passed to an element group grouping process to determine groups of groups (or supergroups) as described below.

Calculating Set of Pairwise Relationship Scores

At 510 of the automatic design element grouping process 500 described above, the EGP 214 calculates a set of pairwise relationship scores for the design element groups defined (in this example) in the element groups dataset.

Similarly, and as described further below, at 808 of the element group grouping process 800 the EGP 214 calculates a set of pairwise relationship scores for the supergroups defined (in this example) in a supergroups dataset.

In both cases the relationship score calculation is similar.

Figure 6:
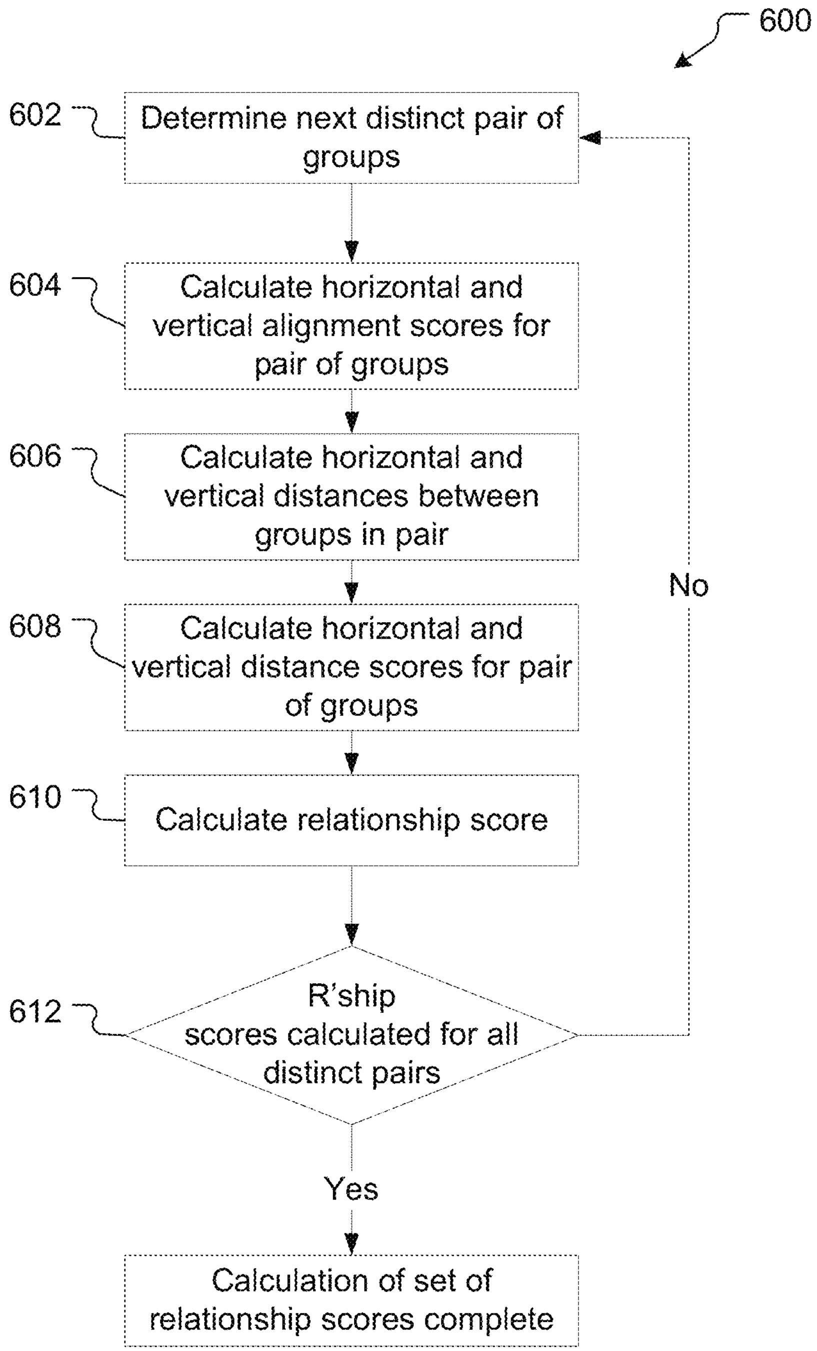
FIG. 6 is a flowchart depicting operations involved in calculating pairwise relationship scores for pairs of design element groups.

An example pairwise relationship score calculation process 600 will be described with reference to FIG. 6.

In process 600, relationship scores are calculated for each distinct pair of groups: i.e. each distinct pair of design element groups when process 600 is performed in the context of automatic element group process 500, or each distinct pair of supergroups when process 600 is performed in the context of automatic group grouping process 800. In this context order is not important, so a group/supergroup pair [A, B] is not distinct when compared to the pair [B, A].

In the present embodiment, relationship scores are stored in a scores dataset: a group scores dataset in the context of element grouping process 500 as described above or a supergroup scores dataset in the context of group grouping process 800 as described below. In a given iteration of the automatic grouping process, however, the membership of all groups will not necessarily have changed. Accordingly, if a relationship score has previously been calculated for a particular pair of groups/supergroups (and the members of those groups have not changed), a score for that particular pair of groups/supergroups need not be recalculated.

At 602, the EGP 214 determines the next distinct pair of groups for which a relationship score is to be calculated. Pairs of groups may be processed in any order or in parallel.

At 604, the EGP 214 calculates a horizontal alignment score and a vertical alignment score for the current pair of groups. The horizontal alignment score provides a measure of how well the two groups are aligned along one or more horizontal axes. The vertical alignment score provides a measure of how well the two groups are aligned along one or more vertical axes. Calculation of the horizontal and vertical alignment scores in accordance with one embodiment is described below, but it will be appreciated that the alignment scores may be calculated in various ways.

In the present embodiments, and generally speaking, calculation of alignment scores involves comparing corresponding pairs of axes based on their coordinates—e.g. comparing one or more of the left axes of the two groups, the horizontal centre axes of the two groups, the right axes of the two groups, the top axes of the two groups, the vertical centre axes of the two groups, and the bottom axes of the two groups. If one or both of the groups in a pair do not have a particular axis (e.g. due to the group including one or more text elements) that pair of axes is ignored in calculating the relationship score.

Where group axes are updated and stored over the course of process 500 (e.g. in the element groups dataset per the above example) group axes are retrieved from the dataset when needed. If group axes are not updated and stored over the course of process 500 EGP 214 calculates the axes when required (based on the axes (and/or position/size attributes) of a group's members.

For each corresponding pair of axes, the EGP 214 calculates an axis pair alignment score. The axis pair alignment score for a corresponding pair of axes is between a minimum axis pair alignment score (0 in the present example) and a maximum axis pair alignment score (100 in the present example).

To calculate the axis pair alignment score for a corresponding pair of axes, the EGP 214 initially determines if the two axis (as defined by their x or y coordinates) are within an aligned threshold distance. If so the EGP 214 is configured to consider the two axes as aligned and record the maximum axis pair alignment score (e.g. 100). Any suitable value may be used for the aligned threshold distance, for example 95 (though alternative thresholds are possible, for example a value between 90 and 100 or an alternative value).

If the two axes are not within the aligned threshold distance the EGP 214 calculates an axis pair alignment score, in this example according to the following equation which will yield a value that (with rounding) is greater than or equal to the minimum alignment score (e.g. 0) and less than the maximum alignment score (e.g. 100):

$$\text{Axis pair alignment score} = 100 * \frac{100}{100 + |va + vb|}$$

where va=the coordinate value of the axis in question of one of the design element groups; and vb=the coordinate value of the corresponding axis of the other design element group.

Following calculation of the axis pair alignment scores, the EGP 214 calculates a horizontal alignment score and a vertical alignment score.

If the EGP 214 determines that at least one axis pair alignment score in respect of a corresponding pair of horizontal axes has exact axis alignment (i.e. the maximum alignment score), the EGP 214 calculates a maximum horizontal alignment score (e.g. 100) for the pair of groups. In certain embodiments, if the EGP 214 determines that a corresponding pair of horizontal axes has exact alignment it ceases calculating the axis pair alignment scores for other corresponding pairs of horizontal axes.

If no corresponding pair of horizontal axes has the maximum alignment score, the EGP 214 calculates the horizontal alignment score as the average of the axis pair alignment scores calculated for all horizontal axis pairs (e.g. one or more of the top axis pair, vertical centre axis pair, bottom axis pair).

Similarly, if the EGP 214 determines that at least one axis pair alignment score in respect of a corresponding pair of vertical axes has exact axis alignment (i.e. the maximum alignment score), the EGP 214 calculates a maximum vertical alignment score (e.g. 100) for the pair of groups. In certain embodiments, if the EGP 214 determines that a corresponding pair of vertical axes has exact alignment it ceases calculating axis pair alignment scores for other corresponding pairs of vertical axes.

If no corresponding pair of vertical axes has the maximum alignment score, the EGP 214 calculates the vertical alignment score as the average of the axis pair alignment scores calculated for all vertical axis pairs (e.g. one or more of the left axis pair, horizontal centre axis pair, right axis pair).

At 606, the EGP 214 calculates a horizontal separation distance and a vertical separation distance between the groups of the current pair. In this context, a horizontal separation distance is a x-axis distance between vertical axes or edges (i.e. a distance between x-coordinates) and a vertical separation distance is a y-axis distance between horizontal axes or edges (i.e. a distance between y-coordinates)

Where relationship scores are being calculated as part of element grouping process 500, the EGP 214 calculates centre-to-centre separation distances between pairs of design element groups.

The horizontal centre-to-centre separation distance between two groups can be calculated by subtracting the x-coordinate value of the horizontal centre axis of one of the design element groups from the x-coordinate value of the horizontal centre axis of the other design element group (and taking the absolute value of the result).

Similarly, the vertical centre-to-centre separation distance between two groups can be calculated by subtracting the y-coordinate value of the vertical centre axis of one of the design element groups from the y-coordinate value of the vertical centre axis of the other design element group (and taking the absolute value of the result).

If a group does not have a horizontal centre axis or a vertical centre axis (due to the existence of one or more text elements), horizontal and/or vertical centre axis coordinates can be calculated based on the size and position attributes of the member elements of the group.

Where relationship scores are being calculated as part of element group grouping process 800 (described below), the EGP 214 calculates edge-to-edge separation distances between pairs of supergroups.

The horizontal edge-to-edge separation distance between two supergroups G1 and G2 can be calculated, for example, as the minimum of:

$$|\text{max x-coordinate of G1} - \text{min x-coordinate of G2}|$$

and $$|\text{min x-coordinate of G1} - \text{max x-coordinate of G2}|$$

Similarly, the vertical edge-to-edge separation distance between two supergroups G1 and G2 can be calculated, for example, as the minimum of:

$$|\text{max y-coordinate of G1} - \text{min y-coordinate of G2}|$$

and $$|\text{min y-coordinate of G1} - \text{max y-coordinate of G2}|$$

At 608, the EGP 214 calculates a horizontal distance score and a vertical distance score for the current pair of groups/supergroups based, respectively, on the horizontal separation distance and vertical separation distance calculated at 606. When calculating the final relationship score, the distance scores act to scale the alignment scores based on the distance between the groups in the pair.

In the present embodiments, the EGP 214 calculates the horizontal and vertical distance scores using the following formula:

$$\text{distance score} = 0.5 * \cos\left(\text{ratio} * \left(\frac{10}{\pi}\right)\right) + 0.5$$

Where ratio=distance/page dimension, clamped with a maximum of 1.

distance=the horizontal separation distance calculated at 606 when calculating the horizontal distance score or the vertical separation distance calculated at 606 when calculating the vertical distance score.

page dimension=the maximum dimension of the page in the horizontal direction when calculating the horizontal distance score or the maximum dimension of the page in the vertical direction when calculating the vertical distance score.

When calculating the vertical distance score, the page dimension is the height (e.g. height 104 in FIG. 1) of the page. When calculating the horizontal distance score, the page dimension is the width (e.g. width 102 in FIG. 1) of the page.

The formula for calculating the horizontal and vertical distance scores for each pair of groups provides a number between 0 and 1. Where the ratio of the distance and the page dimension is smaller, the distance score will be higher (i.e. closer to 1). Conversely, if the ratio of the distance and the page dimension is larger, the distance score will be lower (i.e. closer to 0).

It will be appreciated that the method of calculating the horizontal and vertical distance scores discussed above is only one example and there may be other suitable methods for calculating the distance scores for each pair of groups/supergroups.

At 610, the EGP 214 calculates a relationship score for the current pair of groups/supergroups based on the horizontal and vertical alignment scores and the horizontal and vertical distance scores calculated at 604 and 608, respectively.

In the present embodiment, the EGP 214 calculates a horizontal relationship score by multiplying the horizontal alignment score and vertical distance score and calculates a vertical relationship score by multiplying the vertical alignment score and the horizontal distance score. The EGP 214 will determine the final relationship score for the pair of groups/supergroups being processed as the higher of the horizontal relationship score and the vertical relationship score. It will be appreciated that the method of calculating the relationship scores discussed above is only one example and there may be other suitable methods for calculating the relationship scores for each pair of design element groups.

The EGP 214 stores the relationship score calculated at 610, for example in a group scores dataset or supergroup scores dataset.

At 612, the EGP 214 determines if relationship scores for all distinct pairs of groups have been calculated. If so, calculation of the set of relationship scores is complete. If not, processing returns to 602 to determine the next distinct pair of groups to calculate a relationship score for.

Determining if a Pair of Design Element Groups should be Combined

At 518 of process 500, the EGP 214 determines if a given pair of design element groups should be combined. An example grouping determination method 700 is described with reference to FIG. 7.

At 702, the EGP 214 determines if either design element group of the pair of design element groups being processed has already been combined with another design element group. As the EGP 214 processes each distinct pair of design element groups having a relationship score above a processing threshold value, the EGP 214 may have previously combined one design element group of the pair of design element groups being processed with another design element group of a pair of design element groups that have already been processed. In this case, the EGP 214 cannot combine the design element groups of the pair of design element groups currently being processed.

Accordingly, if the EGP 214 determines that a design element group of the pair has already been combined, processing of the pair ends at 712 without combining the design element groups. Otherwise processing proceeds to 704.

At 704, the EGP 214 determines if either of the design element groups has a single member element. If one or both groups has a single element, processing proceeds to 708 where the groups are combined. If both groups have more than one element, processing proceeds to 706.

At 706, the EGP 214 determines if the design element groups of the pair of design element groups being processes are repeating fragments.

In the present embodiment, the EGP 214 determines that the design element groups are repeating fragments. This determination is made based on whether the design element groups include elements of the same types. In this particular embodiment, determining whether the groups are repeating fragments involves determining whether content map values (the generation of which is described below at 710) for each group are the same. If so the groups are repeating fragments and processing of the pair ends at 712 without combining the groups. If not the groups are not repeating fragments and processing proceeds to 708.

At 708, the EGP 214 combines the design element groups of the pair of design element groups being processed into a single design element group.

In the present embodiment, the EGP 214 combines a pair of design element groups by creating a new group identifier in the element groups dataset, associating the new group identifier with the element identifiers included in the two design element groups being combined, and deleting the two original design element groups from the groups dataset.

Where relationship scores (as calculated at 510) are stored (for example in a group scores dataset), the EGP 214 also deletes any records from the group scores dataset that reference either of the two design element groups that have now been deleted. If this operation is performed the determination at 702 as to whether a group in a given pair has already been combined can be omitted.

Alternatively, the elements from one of the design element groups (e.g. a first group) may be added to the other and the first group then deleted.

Continuing with the groups dataset example provided above, if the EGP 214 determined that the pair of design element groups [G001, G003] should be combined, the resulting element groups dataset may be as follows:

| Design element group identifier | Element identifiers | Group axes |
|---|---|---|
| G002 | [E002] | [L2, <null>, <null>, T2, B2, VC2] |
| G004 | [E004] | [L4, R4, HC4, T4, B4, VC4] |
| G005 | [E001, E003] | [<null>, average(R1, R3), <null>, average(T1, T3), average(B1, B3), average(VC1, VC3)] |

In this case, combining the design element groups involves creating a new group identifier (G005) with the elements of the two groups being combined (E001, E003) and deleting the two original groups (G001 and G003).

In addition, and continuing the example in which group axes are progressively calculated/stored in the element groups dataset, the group axes for new group G005 are calculated. In this example, as group G003 did not have a left or horizontal centre axis new group G005 does not have these axes. The other axes of group G005 are calculated as the averages of the corresponding axis pairs from groups G001 and G003.

At 710, the EGP 214 generates and stores a content map for the design element group created at step 708.

In the present embodiment, the content map for a design element group is based on the types of the elements in that group. To determine element types the EGP 214 may use the relevant group identifier to determine the element identifier of each element belonging to that group, e.g. by reference to a groups dataset as described above. The EGP 214 may subsequently use the element identifiers to determine the element types (e.g. image, text, or other relevant type), for example by reference to a type attribute as described above.

Using the member element types, the EGP 214 generates a group content descriptor that, in the present example, codifies the different element types in the group and the number of elements of each type in the group. For example; a group with 3 rectangular elements, 2 shape elements, 1 text element may have a group content descriptor such as: [rect 3, shape 2, text, 1]; a group with 4 text elements may have a group content descriptor such as: [text, 4]. The group content descriptor may be generated in various ways, for example by processing the member elements of the group in order (e.g. depth order, the order the elements appear in the group's element array, or an alternative order) and populating the group content descriptor as each element is processed.

Once generated, the EGP 214 sorts the group content descriptor. Any sorting order may be used—for lexicographic order.

Following sorting of the group content descriptor the EGP 214 calculates a content map value based thereon. In this present example, the content map value is a concatenation of the sorted content descriptor (e.g. "rect3shape2text1"). In alternative examples a hash function may applied to the sorted content descriptor to generate a hash value.

With this method element groups that have the same number of each type of element will generate the same content map value. For example, an element group that generates the group content descriptor [text 1, rect 3, shape 2] will lead to the same content map value as an element group that generates the group content descriptor [shape 2, rect 3, text, 1].

The EGP 214 may associate a content map value (and/or group content descriptor) with the relevant group identifier in any appropriate manner. For example, the element groups dataset described above may be extended to store content map values—e.g. as follows:

| Design element group identifier | Elements | Content map value |
|---|---|---|
| G002 | [E002] | |
| G004 | [E004] | |
| G005 | [E001, E003] | "shape1text1" |

In this example, the content map value for design element group G005 has been generated and stored, but no content map values have been generated/stored for groups G002 or G004 (as these groups only include a single element).

In alternative embodiments, the EGP 214 is configured to generate content map values (and/or group content descriptors) only when they are needed (for example on the fly at 706). In this case content maps need not be created or stored at 710.

Automatic Element Group Grouping Process

In some implementations, once automatic element grouping process 500 is complete (i.e. design element groups are returned at 528), the EGP 214 may automatically perform an element group grouping process to create supergroups—i.e. to groups of element groups.

Figure 8:
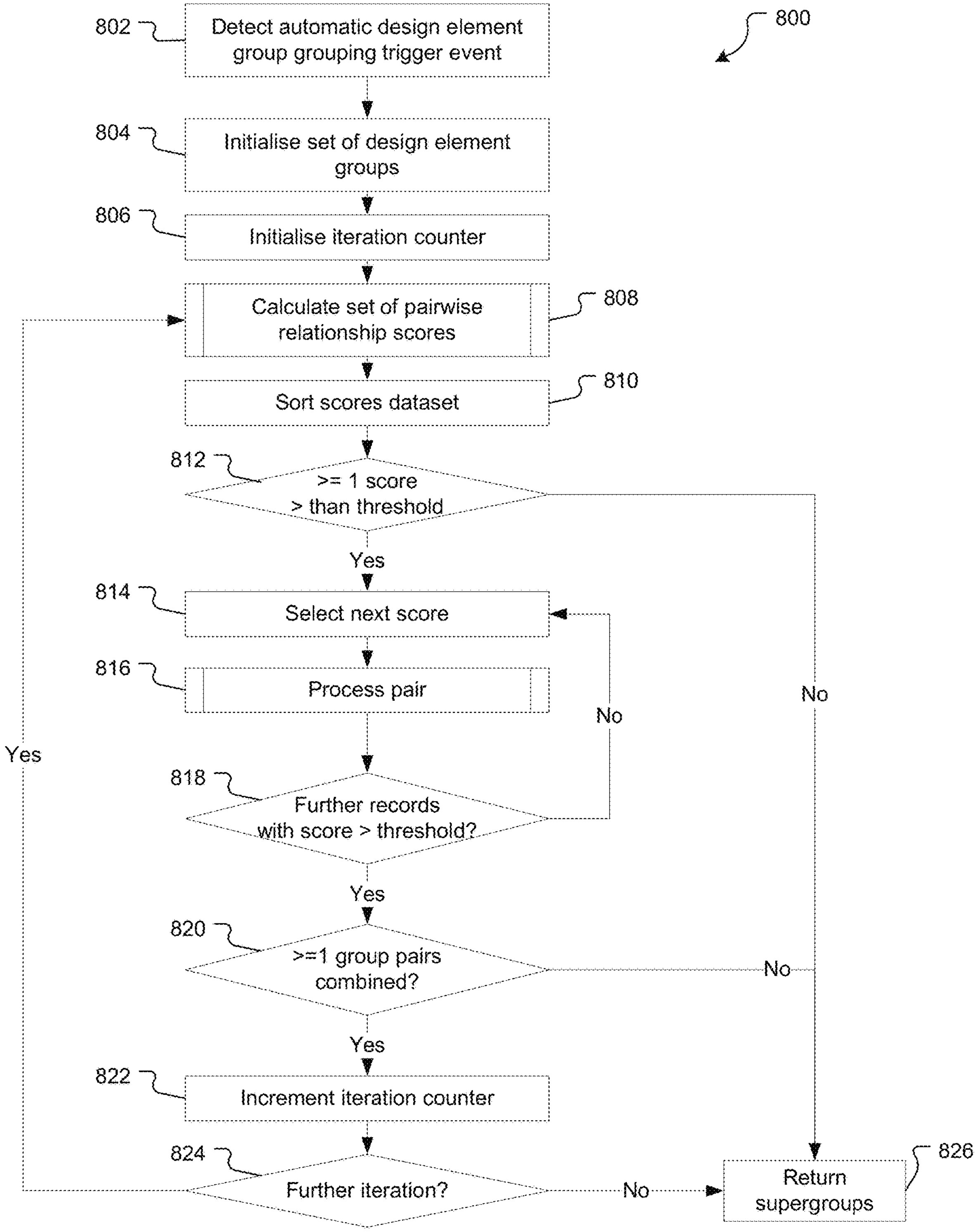
FIG. 8 is a flowchart depicting operations involved in an automatic element group grouping process.

FIG. 8 is a flowchart depicting operations involved in an automatic element group grouping process 800. Process 800 operates to automatically determine if design element groups can be grouped into one or more supergroups and, if so, create such supergroups.

In the present example process 800 is automatically performed following element grouping process 500 described above and with the element groups returned at 528 as input. In alternative embodiments, process 800 could be performed (or be adapted to be performed) at other times and/or based on element groups determined by an alternative element grouping process.

Many operations in group grouping process 800 are similar to or the same as operations performed in element grouping process 500. These operations will not be described again in detail.

At 802, the EGP 214 detects a trigger event to automatically group design element groups into supergroups. The trigger event may be detection by the EGP 214 that the automatic element grouping process 500 has been completed or detection of a user activating a specific user interface control (e.g. displayed on design creation user interface 400).

At 804, the EGP 214 initialises a set of supergroups. In the present embodiment, this involves retrieving (or receiving as part of process 800 being triggered) all the design element groups determined using the automatic element grouping process 500 that comprise more than one design element. By way of example, and similar to process 500, EGP 214 may generate a supergroups dataset which is used over the course of process 800 to store associations between supergroups (via supergroup identifiers) and member groups (via element group identifiers). Such a dataset is initialised at 804 by associating each group identifier that identifies a group with more than one element with a different supergroup identifier. For example:

| Supergroup identifier | Element group identifiers | Supergroup axes |
|---|---|---|
| S001 | [G012] | [L1, R1, HC1, T1, B1, VC1] |
| S002 | [G015] | [L2, R2, HC2, T2, B2, VC2] |
| S003 | [G016] | [L3, R3, HC3, T1, <null>, <null>] |
| S004 | [G022] | [L4, <null>, <null>, T4, <null>, <null>] |

In this example the element groups dataset also stores the axes for each supergroup, however as described with respect to the element groups dataset (and element grouping process 500) axes may instead be calculated as needed.

At 806, the EGP 214 initialises an iteration counter variable (e.g. to 0).

At 808, the EGP 214 calculates a set of pairwise relationship scores for the supergroups. The set of pairwise relationship scores includes a calculated relationship score for each distinct pairing of supergroups initialised at step 804. Relationship scores calculated at 808 may be stored in a supergroup scores dataset similar to the group scores dataset described above—for example:

| Pairing of design element super groups | Relationship score |
|---|---|
| [S001, S002] | |
| [S001, S003] | |
| [S001, S004] | |
| [S002, S003] | |
| [S002, S004] | |
| [S003, S004] | |

Calculating the set of pairwise relationship scores at 808 is per the pairwise relationship score calculation process 600 described above.

At 810, the EGP 214 sorts the set of supergroup relationship scores in descending order (highest score to lowest).

At 812, the EGP 214 determines if any of the supergroup relationship scores are above a supergroup score threshold value. If so, processing proceeds to step 814. If not, processing proceeds to step 826. In the present example, the supergroup score threshold is the same as the group score threshold value described at 514 above. Alternative thresholds may, however, be used.

At 814, the EGP 214 selects the next unprocessed pair of supergroups having the highest relationship score.

Figure 9:
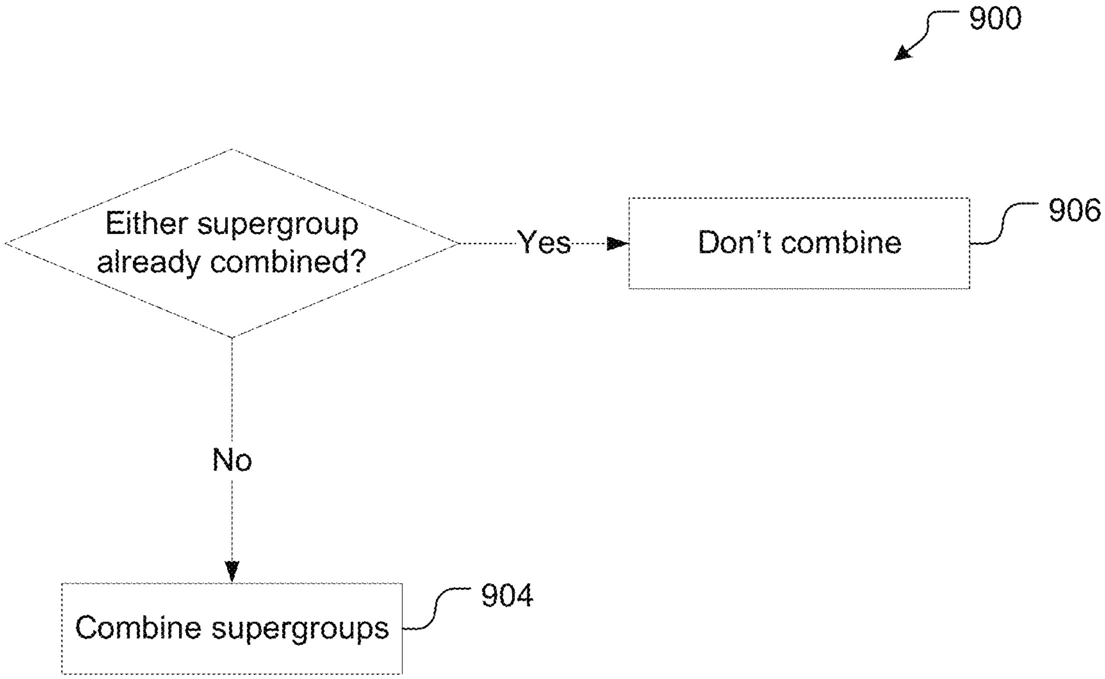
FIG. 9 is a flowchart depicting operations involves in determining whether a particular pair of supergroups should be combined together.

At 816, the EGP 214 processes the pair of supergroups selected at 814 to determine if the supergroups of the pair should be combined together. This is discussed in further detail below with reference to FIG. 9.

At 818, the EGP 214 determines if there are any other pairs of supergroups in the set of relationship scores with a relationship score above the supergroup score threshold value. If so, processing returns to step 814. If not, processing proceeds to step 820.

At 820, the EGP 214 determines if at least one pair of supergroups has been combined. If so, processing proceeds to step 822. If not, processing proceeds to step 826.

At 822, the EGP 214 increments the iteration counter.

At 824, the EGP 214 determines if a further iteration is required. If the iteration counter indicates that the predefined maximum number of iterations has been performed, processing proceeds to step 826. If not, processing returns to step 808 to perform a further iteration (the further iteration taking into account the supergroups that were combined at 816). Once again, any appropriate number of iterations may be performed, for example 10 (or an alternative number).

At 826, the EGP 214 returns the supergroups as defined, for example, by the current state of the supergroups dataset.

Each supergroup defined by the supergroups dataset is associated with a set of one or more group identifiers which indicates the groups that are members of the supergroup. Each group identifier can, in turn, be used to determine the elements that are members of that group (e.g. via groups dataset generated by automatic grouping process 500).

The supergroups identified by process 700 can be used in various ways, for example to visually indicate supergroups to a user, to determine how elements on the page should be treated during a page resize operation, an element layout operation, and/or in other operations.

Determining if Supergroups should be Combined

At 816 of element group grouping process 800 the EGP 214 determines if any pairs of supergroups should be combined. An example process 900 for making this determination (and, where appropriate, combining supergroups) is described with reference to FIG. 9.

At 902, the EGP 214 determines if either supergroup of the pair of supergroups being processed has already been combined with another supergroup. This operation is similar to operation 702 described above. If the EGP 214 determines that a supergroup of the pair has already been combined, processing of the pair ends at 906 without combining the supergroups. Otherwise processing proceeds to 904.

At 904, the EGP 214 combines the supergroups of the pair of design element groups being processed into a single supergroup.

In the present embodiment, the EGP 214 combines a pair supergroups at 904 by creating a new supergroup identifier in the supergroups dataset, associating the new supergroup identifier with the group identifiers of the two supergroups being combined, and deleting the two original supergroups from the groups dataset.

Where relationship scores (as calculated at 808) are stored (for example in a supergroup scores dataset), the EGP 214 may also delete any records from the supergroup scores dataset that reference either of the two supergroups that have now been deleted. If this operation is performed the determination at 902 can be omitted.

Alternatively, the groups of one of the supergroups (e.g. a first supergroup) may be added to the other supergroup and the first supergroup then deleted.

Continuing with the supergroups dataset example provided above, if the EGP 214 determined that the pair of supergroups [S001, S002] should be combined, the resulting supergroups dataset may be as follows:

| Supergroup identifier | Element group identifiers | Supergroup axes |
|---|---|---|
| S003 | [G016] | [L3, R3, HC3, T1, <null>, <null>] |
| S004 | [G022] | [L4, <null>, <null>, T4, <null>, <null>] |
| S005 | [G012, G015] | [average(L1, L2), average(R1, R2), average(HC1, HC2), average(T1, T2), average(B1, B2), average(VC1, VC2)] |

In this case, combining supergroups involves creating a new supergroup identifier (S005) with group identifiers from the two groups being combined (G012, G015) and deleting the two original supergroups (S001 and S002).

As can be seen, a given supergroup identifier in the supergroups dataset (e.g. S005) identifies member element groups by group identifiers (e.g. G012 and G015). Each group identifier can then be used to determine the member elements of that group, e.g. by reference to the groups dataset.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms “include” and “comprise” (and variations thereof such as “including”, “includes”, “comprising”, “comprises”, “comprised” and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:

calculating, by one or more computer processing devices, a horizontal relationship score for a distinct pair of design element groups comprising a first design element group and a second design element group, wherein the first design element group is associated with a first horizontal axis, the second design element group is associated with a second horizontal axis, and calculating the horizontal relationship score comprises:

calculating, by the one or more computer processing devices, a first axis pair alignment score based on an alignment of the first horizontal axis and the second horizontal axis;

calculating, by the one or more computer processing devices, a horizontal alignment score based on the first axis pair alignment score; and calculating, by the one or more computer processing devices, the horizontal relationship score based on the horizontal alignment score;

determining, by the one or more computer processing devices and based on the horizontal relationship score, that the first design element group and the second design element group of the distinct pair of design element groups should be combined; and in response to determining that the first design element group and the second design element group of the distinct pair of design element groups should be combined, combining the first design element group and the second design element group of the distinct pair of design element groups into a single combined design element group.

2. The computer implemented method of claim 1, wherein:

the first design element group is associated with a third horizontal axis;

the second design element group is associated with a fourth horizontal axis;

the method further comprises calculating, by the one or more computer processing devices, a second axis pair alignment score based on an alignment of the third horizontal axis and the fourth horizontal axis; and the horizontal alignment score is calculated based on the first axis pair alignment score and the second axis pair alignment score.

3. The computer implemented method of claim 2, wherein the horizontal alignment score is calculated as an average of the first axis pair alignment score and the second axis pair alignment score.

4. The computer implemented method of claim 2, wherein calculating the horizontal alignment score comprises:

determining that at least one of the first axis pair alignment score and the second axis pair alignment score is a maximum axis alignment score; and calculating the horizontal alignment score to be a maximum horizontal alignment score.

5. The computer implemented method of claim 2, wherein:

the first design element group is associated with a fifth horizontal axis;

the second design element group is associated with a sixth horizontal axis;

the method further comprises calculating, by the one or more computer processing devices, a third axis pair alignment score based on an alignment of the fifth horizontal axis and the sixth horizontal axis; and the horizontal alignment score is calculated based on the first axis pair alignment score, the second axis pair alignment score, and the third axis pair alignment score.

6. The computer implemented method of claim 5, wherein:

the first horizontal axis is a top axis of the first design element group;

the second horizontal axis is a top axis of the second design element group;

the third first horizontal axis is a bottom axis of the first design element group;

the fourth horizontal axis is a bottom axis of the second design element group;

the fifth horizontal axis is a vertical-centre axis of the first design element group; and the sixth horizontal axis is a vertical-centre axis of the second design element group.

7. The computer implemented method of claim 1, further comprising:

calculating, by the one or more computer processing devices, a vertical distance score based on a vertical separation distance between the first design element group and the second design element group, and wherein the horizontal relationship score is calculated based on the horizontal alignment score and the vertical distance score.

8. The computer implemented method of claim 7, wherein:

the first design element group and the second design element group are associated with a design page; and the vertical distance score is calculated based on a maximum height of the design page.

9. The computer implemented method of claim 1, wherein calculating the horizontal alignment score comprises:

determining that the first horizontal axis and the second horizontal axis are within a threshold distance of one another; and calculating the horizontal alignment score to be a maximum horizontal alignment score.

10. The computer implemented method of claim 1, wherein calculating the horizontal alignment score comprises:

determining that the first horizontal axis and the second horizontal axis are not within a threshold distance of one another; and calculating the horizontal alignment score to be less than a maximum horizontal alignment score.

11. The computer implemented method of claim 1, wherein:

the first design element group includes a single design element;

the single design element is associated with a horizontal element axis; and the first horizontal axis is the horizontal element axis.

12. The computer implemented method of claim 1, wherein:

the first design element group includes a plurality of design elements;

each design element in the plurality of design elements is associated with a horizontal element axis; and the first horizontal axis is calculated based on the horizontal element axes of the plurality of design elements.

13. The computer implemented method of claim 1, wherein:

the first design element group is associated with a first vertical axis;

the second design element group is associated with a second vertical axis;

the method further comprises calculating, by the one or more computer processing devices, a vertical relationship score in respect of the first design element group and the second design element group, wherein calculating the vertical relationship score comprises:

calculating, by the one or more computer processing devices, a fourth axis pair alignment score based on an alignment of the first vertical axis and the second vertical axis;

calculating, by the one or more computer processing devices, a vertical alignment score based on the fourth axis pair alignment score; and calculating, by the one or more computer processing devices, the vertical relationship score based on the vertical alignment score; and determining that the first design element group and the second design element group should be combined further includes determining that the horizontal relationship score is more optimal than the vertical relationship score.

14. A computer processing system comprising:

one or more computer processing devices; and one or more non-transitory computer-readable storage media storing instructions which, when executed by the one or more computer processing devices, cause the one or more computer processing devices to perform a method comprising:

calculating a horizontal relationship score for a distinct pair of design element groups comprising a first design element group and a second design element group, wherein the first design element group is associated with a first horizontal axis, the second design element group is associated with a second horizontal axis, and calculating the horizontal relationship score comprises:

calculating a first axis pair alignment score based on an alignment of the first horizontal axis and the second horizontal axis;

calculating a horizontal alignment score based on the first axis pair alignment score; and calculating the horizontal relationship score based on the horizontal alignment score;

determining, based on the horizontal relationship score, that the first design element group and the second design element group of the distinct pair of design element groups should be combined; and in response to determining that the first design element group and the second design element group of the distinct pair of design element groups should be combined, combining the first design element group and the second design element group of the distinct pair of design element groups into a single combined design element group.

15. The computer processing system of claim 14, wherein:

the first design element group is associated with a third horizontal axis;

the second design element group is associated with a fourth horizontal axis;

the method further comprises calculating, by the one or more computer processing devices, a second axis pair alignment score based on an alignment of the third horizontal axis and the fourth horizontal axis; and the horizontal alignment score is calculated based on the first axis pair alignment score and the second axis pair alignment score.

16. The computer processing system of claim 15, wherein the horizontal alignment score is calculated as an average of the first axis pair alignment score and the second axis pair alignment score.

17. The computer processing system of claim 14, wherein the method further comprises:

calculating a vertical distance score based on a vertical separation distance between the first design element group and the second design element group, and wherein the horizontal relationship score is calculated based on the horizontal alignment score and the vertical distance score.

18. One or more non-transitory computer-readable storage media storing instructions which, when executed by one or more computer processing devices, cause the one or more computer processing devices to perform a method comprising:

calculating a horizontal relationship score for a distinct pair of design element groups comprising a first design element group and a second design element group, wherein the first design element group is associated with a first horizontal axis, the second design element group is associated with a second horizontal axis, and calculating the horizontal relationship score comprises:

calculating a first axis pair alignment score based on an alignment of the first horizontal axis and the second horizontal axis;

calculating a horizontal alignment score based on the first axis pair alignment score; and calculating the horizontal relationship score based on the horizontal alignment score;

determining, based on the horizontal relationship score, that the first design element group and the second design element group of the distinct pair of design element groups should be combined; and in response to determining that the first design element group and the second design element group of the distinct pair of design element groups should be combined, combining the first design element group and the second design element group of the distinct pair of design element groups into a single combined design element group.

19. The one or more non-transitory computer-readable storage media of claim 18, wherein:

the first design element group is associated with a third horizontal axis;

the second design element group is associated with a fourth horizontal axis;

the method further comprises calculating, by the one or more computer processing devices, a second axis pair alignment score based on an alignment of the third horizontal axis and the fourth horizontal axis; and the horizontal alignment score is calculated based on the first axis pair alignment score and the second axis pair alignment score.

20. The one or more non-transitory computer-readable storage media of claim 18, wherein the method further comprises:

calculating a vertical distance score based on a vertical separation distance between the first design element group and the second design element group, and wherein the horizontal relationship score is calculated based on the horizontal alignment score and the vertical distance score.

* * * * *